(12) United States Patent
Xue et al.

(10) Patent No.: US 11,570,060 B2
(45) Date of Patent: Jan. 31, 2023

(54) ARTIFICIAL INTELLIGENCE REAL-TIME MICROSEISM MONITORING NODE

(71) Applicant: INSTITUTE OF GEOLOGY AND GEOPHYSICS, CHINESE ACADEMY OF SCIENCES, Beijing (CN)

(72) Inventors: Qingfeng Xue, Beijing (CN); Yibo Wang, Beijing (CN); Yikang Zheng, Beijing (CN); Yi Yao, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/507,766

(22) Filed: Oct. 21, 2021

(65) Prior Publication Data
US 2022/0182292 A1  Jun. 9, 2022

(30) Foreign Application Priority Data

Dec. 9, 2020 (CN) .......................... 202011424729.3

(51) Int. Cl.
| | |
|---|---|
| H04L 41/16 | (2022.01) |
| G01V 1/00 | (2006.01) |
| G01V 1/28 | (2006.01) |
| H04W 24/02 | (2009.01) |
| G06N 3/063 | (2006.01) |
| G06N 3/04 | (2006.01) |

(52) U.S. Cl.
CPC .............. *H04L 41/16* (2013.01); *G06N 3/04* (2013.01); *G06N 3/063* (2013.01); *H04W 24/02* (2013.01)

(58) Field of Classification Search
CPC ....... H04L 41/16; G06N 3/063; H04W 24/02; G01V 1/003; G01V 1/288; G01V 1/18
See application file for complete search history.

(56) References Cited

U.S. PATENT DOCUMENTS

| | | | | |
|---|---|---|---|---|
| 2014/0334260 | A1* | 11/2014 | Chang | G01V 1/305 367/27 |
| 2019/0324166 | A1* | 10/2019 | Lolla | G01V 1/42 |
| 2020/0116882 | A1 | 4/2020 | Zheng et al. | |
| 2020/0309974 | A1* | 10/2020 | Mondragon | G06N 20/00 |

FOREIGN PATENT DOCUMENTS

| | | |
|---|---|---|
| CN | 109765610 A | 5/2019 |
| CN | 111046737 A | 4/2020 |
| CN | 111123355 A | 5/2020 |
| CN | 111126471 A | 5/2020 |
| CN | 111796327 A | 10/2020 |

* cited by examiner

*Primary Examiner* — Shirley X Zhang (57) ABSTRACT

The application discloses an AI real-time microseism monitoring node, which includes a processor and a data acquisition device, an AI calculation device, and a communication device connected to the processor, wherein the AI calculation device is provided with pre-trained microseism data analysis Device, and the processor is configured to perform the following operations: controlling the data acquisition equipment to acquire microseism data; turning on the AI calculation device to calculate the acquired microseism data by means of the microseism data analysis device to determine the valid event data associated with the microseism; and sending the valid event data to the remote data center through the communication device.

6 Claims, 9 Drawing Sheets

ARTIFICIAL INTELLIGENCE REAL-TIME MICROSEISM MONITORING NODE

FIELD OF THE INVENTION

This application relates to the technical field of seismic acquisition equipment, in particular to an artificial intelligence (AI) real-time microseism monitoring node.

BACKGROUND OF THE INVENTION

Microseism and micro-motion nodes (or microseism and micro-motion geophone) are widely used in passive source geophysical response monitoring scenarios, such as unconventional oil and gas development, induced seismic monitoring, deep geological engineering monitoring, background noise monitoring, and urban underground space detection, etc. Conventional microseism monitoring nodes usually use such a set of monitoring and processing processes, i.e., manually deploying stations, long-term passive source monitoring, manual collection of stations, centralized reading of data and analysis of data results. However, as monitoring requirements increase, there is a growing need to be able to perform real-time monitoring and processing analysis. Real-time monitoring and processing analysis will help to better understand the real-time underground transformation situation and dynamically adjust the construction plan or take emergency treatment means. In recent years, with the rapid development of high-speed mobile networks, microseism monitoring nodes have also started to make attempts toward real-time transmission. A real-time monitoring system and monitoring method for microseism fracturing based on wireless WIFI network has been implemented. However, all these microseism nodes can only transmit back the data, and calculations are still performed in the data center. As the construction of microseism monitoring network continues to advance, a large number of microseism nodes will be connected to the monitoring system and the data acquired will be massive. Taking Smartsolo's current generic microseism monitoring nodes as an example, the amount of monitoring data from 200 three-component microseism nodes in a month will sometimes reach 45 TB. Conventional data return will lead to high system transmission pressure and heavy computing load in the data center, making real-time processing impossible to reach. At the same time, the conventional processing methods of massive data have also encountered the problem of excessive manual intervention and low efficiency.

At present, no effective solutions have been proposed to solve the technical problems in the above-mentioned prior art, such as the massive amount of microseism data analysis is carried out in the data center, which leads to high data transmission pressure, excessive computational load on the data center and inefficiency due to excessive manual intervention.

SUMMARY OF THE INVENTION

The embodiments of the present disclosure provide an artificial intelligence (AI) real-time micro-seismic monitoring node, which can at least solve the technical problems existing in the prior art, such as massive microseism data analysis is carried out in the data center, which leads to high data transmission pressure, excessive computational load on the data center and inefficiency due to excessive manual intervention.

According to one aspect of the embodiments of the present disclosure, an AI real-time microseism monitoring node is provided, which comprises: a processor, a data acquisition device, an AI calculation device, and a communication device connected to the processor, wherein the AI calculation device comprises a pre-trained microseism data analysis device, the processor is configured to perform the following operations: controlling the data acquisition device to acquire microseism data; turning on the AI calculation device to calculate the acquired microseism data by means of the microseism data analysis device to determine the valid event data associated with the microseism; and sending the valid event data to the remote data center through the communication device.

Optionally, the operation of calculation on the acquired microseism data by means of the microseism data analysis device to determine the valid event data associated with the microseism, comprises: calculating the acquired microseism data by means of the microseism data analysis device to determine the occurrence probability of microseism associated with the microseism; and/or calculating the acquired microseism data by means of the microseism data analysis device to determine a probability of preliminary wave location of the microseism.

Optionally, the microseism data analysis device comprises: an input layer, a feature extraction layer, a linear layer, a three-layer Bi-LSTM layer, a fully connected layer and an output layer, wherein the feature extraction layer comprises four convolutional layers: the convolution kernel of the first convolutional layer is (9, 9), the convolution kernel of the second convolutional layer is (7, 7), and the convolution kernel of the third convolutional layer is (5,5), the convolution kernel of the fourth convolutional layer is (3, 3), and between the two adjacent convolution layers is a pooling layer with a pooling kernel of 3.

Optionally, the processor is an STM32-based microcontroller unit.

Optionally, the STM32-based microcontroller unit is further configured with a trigger threshold for microseism data and, upon determining that the microseism data reaches the trigger threshold, turns on the AI calculation device.

Optionally, it further comprises: a positioning device, the positioning device is a GPS device or a BeiDou device, and turning on the positioning device, when determining that the microseism data reaches the trigger threshold.

Optionally, the microseism data analysis device is trained based on a simplified deep learning training framework of TensorFlow Lite.

Optionally, the AI calculation device is based on RISC-V architecture.

Optionally, the communication device is any one of the following: 4G device, 5G device, NB-IOT device.

Optionally, the AI real-time microseism monitoring node is connected to a base station and sends the valid event data to a remote data center via the communication device, comprises: sending the valid event data to the base station via the communication device, sending the valid event data to the remote data center via the base station.

Optionally, a relay gateway is also provided between the base station and the AI real-time microseism monitoring node, and the valid event data is sent to the remote data center via the communication device, comprises: sending the valid event data to the relay gateway via the communication device, sending the valid event data to the base station via the relay gateway, and sending the valid event data to the remote data center via the base station.

Optionally, the data acquisition device comprises at least: an analog channel preamplification and AD signal acquisition unit, an FPGA logic control unit, an acquisition channel management unit, a clock simulation unit, and an acquisition signal control unit, wherein the acquisition channel management unit is connected to the analog channel preamplification and AD signal acquisition unit, the acquisition signal control unit, and the FPGA logic control unit, the acquisition signal control unit and the FPGA logic control unit are connected to the AI calculation device, and the clock analog unit is connected to the FPGA logic control unit.

In the embodiment of the present disclosure, the AI real-time microseism monitoring node first acquires microseism data, then uses the microseism data analysis device of the AI calculation device to process the acquired data to obtain valid event data, and finally sends the valid event data to the remote data center. Compared with the prior art, this solution can process the microseism data at the data acquisition end (i.e., AI real-time microseism monitoring node) and send the calculated valid event data to the remote data center, so the amount of data sent can be significantly reduced and the remote data center only needs to analyze the valid event data. In this way, the technical effect of reducing the pressure of data transmission and the computing load of the remote data center is achieved. In addition, the AI real-time microseism monitoring node uses the microseism data analysis device to calculate the microseism data, so manual intervention can be reduced and efficiency can be improved. In this way, the technical problems of the prior art are solved, i.e., the massive amount of microseism data analysis is carried out in the remote data center, which leads to high data transmission pressure, excessive computational load on the remote data center and inefficiency due to excessive manual intervention.

BRIEF DESCRIPTION OF THE DRAWINGS

The accompanying Figures illustrated herein are used to provide a further understanding of the present disclosure and form a part of the present application. The exemplary embodiments of the present disclosure and descriptions thereof are used to explain the present disclosure, and do not constitute an improper limitation of the present disclosure. Figures show.

DESCRIPTION OF THE EMBODIMENTS

In order to enable a person skilled in the art to better understand the technical solutions of the present disclosure, the technical solutions in the embodiments of the present disclosure will be described clearly and completely in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by a person skilled in the art without creative work should fall within the protection scope of the present disclosure.

It should be noted that the terms "first" and "second" in the specification and claims of the present disclosure and the above-mentioned drawings are used to distinguish similar objects, and not necessarily used to describe a specific sequence. It should be understood that the data used in this way can be interchanged under appropriate circumstances so that the embodiments of the present disclosure described herein can be implemented in a sequence other than those illustrated or described herein. In addition, the terms "including", "comprising" and "having" and any variations thereof are intended to cover non-exclusive inclusions, e.g., a process, method, system, product, or device that comprising a series of steps or units need not be limited to those clearly listed, but may include other steps or units not clearly listed or inherent to the process, method, product, or device.

Embodiment 1

According to the embodiments, an Artificial Intelligence (AI) real-time microseism monitoring nod selected from a group of a plurality of AI real-time microseism monitoring nodes that are used to acquire valid event data from different locations is provided. The AI real-time microseism monitoring node comprises: a processor, a data acquisition device, an AI calculation device, and a communication device connected to the processor. The AI calculation device comprises a pre-trained microseism data analysis device. The processor is configured to perform the following operations: controlling the data acquisition device to acquire microseism data; turning on the AI calculation device to calculate the acquired microseism data by means of the microseism data analysis device to determine the valid event data associated with the microseism; and sending the valid event data to the remote data center through the communication device.

As described in the background, as the construction of microseism monitoring network continues to advance, a large number of microseism nodes will be connected to the monitoring system and the data acquired will be massive. Taking Smartsolo's current generic microseism monitoring nodes as an example, the amount of monitoring data from 200 three-component microseism nodes in a month will sometimes reach 45 TB. Conventional data return will lead to high system transmission pressure and heavy computing load in the remote data center, making real-time processing impossible to reach. At the same time, the conventional processing methods of massive data have also encountered the problem of excessive manual intervention and low efficiency.

Figure 1:
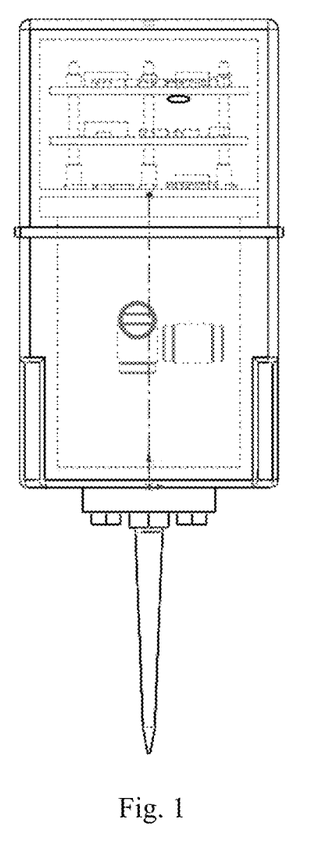
FIG. 1 is a schematic diagram of the overall structure of an AI real-time microseism monitoring node according to Embodiment 1 of the present disclosure; a block diagram of the hardware structure of a calculation device of the method.

In view of the technical problems existing in the background, this embodiment provides an AI real-time microseism monitoring node. As shown in FIG. 1, the AI real-time microseism monitoring node can be used in passive geophysical response monitoring scenarios such as oil and gas development, induced earthquake monitoring, deep geological engineering monitoring, background noise monitoring, and urban underground space detection.

Figure 2A:
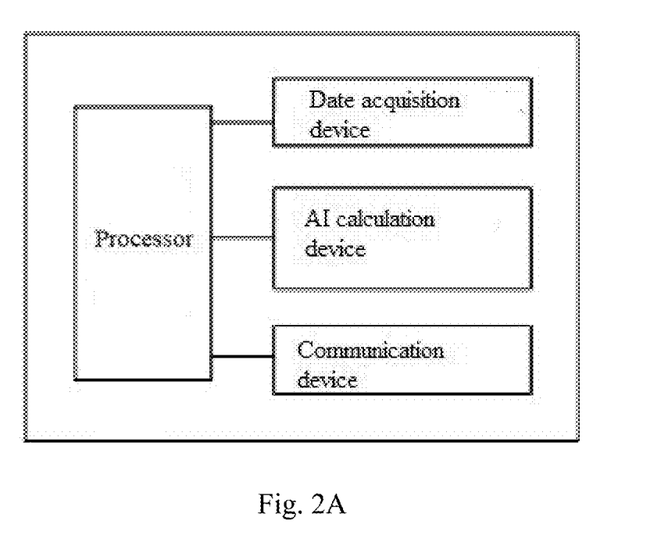
FIG. 2A is a schematic structural diagram of an AI real-time microseism monitoring node according to an embodiment of the present disclosure.

Specifically, referring to FIG. 2A, the AI real-time microseism monitoring node at least comprises the processor, the data acquisition device, the AI calculation device, and the communication device which are connected to the processor. The artificial intelligence computing device comprises a pre-trained microseism data analysis device. The microseism data analysis device may be trained based on a convolutional neural network device and/or a recurrent neural network device. The training data may, for example, use a standard microseism in database.

The processor can first control the data acquisition device to acquire microseism data, e.g., seismic wave data.

After the data acquisition device acquires the microseism data, the processor turns on the AI calculation device, and calculates the acquired microseism data by means of the microseism data analysis device, such as removing invalid data, noise data, or predicting based on the acquired data, the probability of a microseism, and finally effective event data related to microseism. Finally, the processor sends the valid event data to the remote data center via the communication device. For example: the processor removes invalid data, noise data, or predicting the probability of an earthquake based on the acquired data, and obtains the valid event data related to microseism. Finally, the processor sends the valid event data to the remote data center via the communication device.

In this way, the AI real-time microseism monitoring node according to the present disclosure first acquires microseism data, then the microseism data analysis device of the AI calculation device is used to process the acquired data to obtain the valid event data, and finally the valid event data is sent to the remote data center. Compared with the prior art, this solution can process the microseism data at the data acquisition end (i.e., AI real-time microseism monitoring node) and the data sent to the remote data center is calculated valid event data, so the amount of data sent can be significantly reduced, and the remote data center only needs to analyze the valid event data. In this way, the technical effect of reducing the pressure of data transmission and the computing load of the remote data center is achieved. In addition, the AI real-time microseism monitoring node uses the microseism data analysis device to calculate the microseism data, so manual intervention can be reduced and efficiency can be improved. In this way, the technical problems of the prior art are solved, i.e., the massive amount of microseism data analysis is carried out in the remote data center, which leads to high data transmission pressure, excessive computational load on the remote data center and inefficiency due to excessive manual intervention.

Optionally, the data acquisition device comprises at least: an analog channel pre-amplification and AD signal acquisition unit, an FPGA logic control unit, an acquisition channel management unit, a clock simulation unit, and an acquisition signal control unit, wherein the acquisition channel management unit is connected to the analog channel pre-amplification and AD signal acquisition unit, the acquisition signal control unit, and the FPGA logic control unit, the acquisition signal control unit and the FPGA logic control unit are connected to the AI calculation device, and the clock analog unit is connected to the FPGA logic control unit.

Figure 2B:
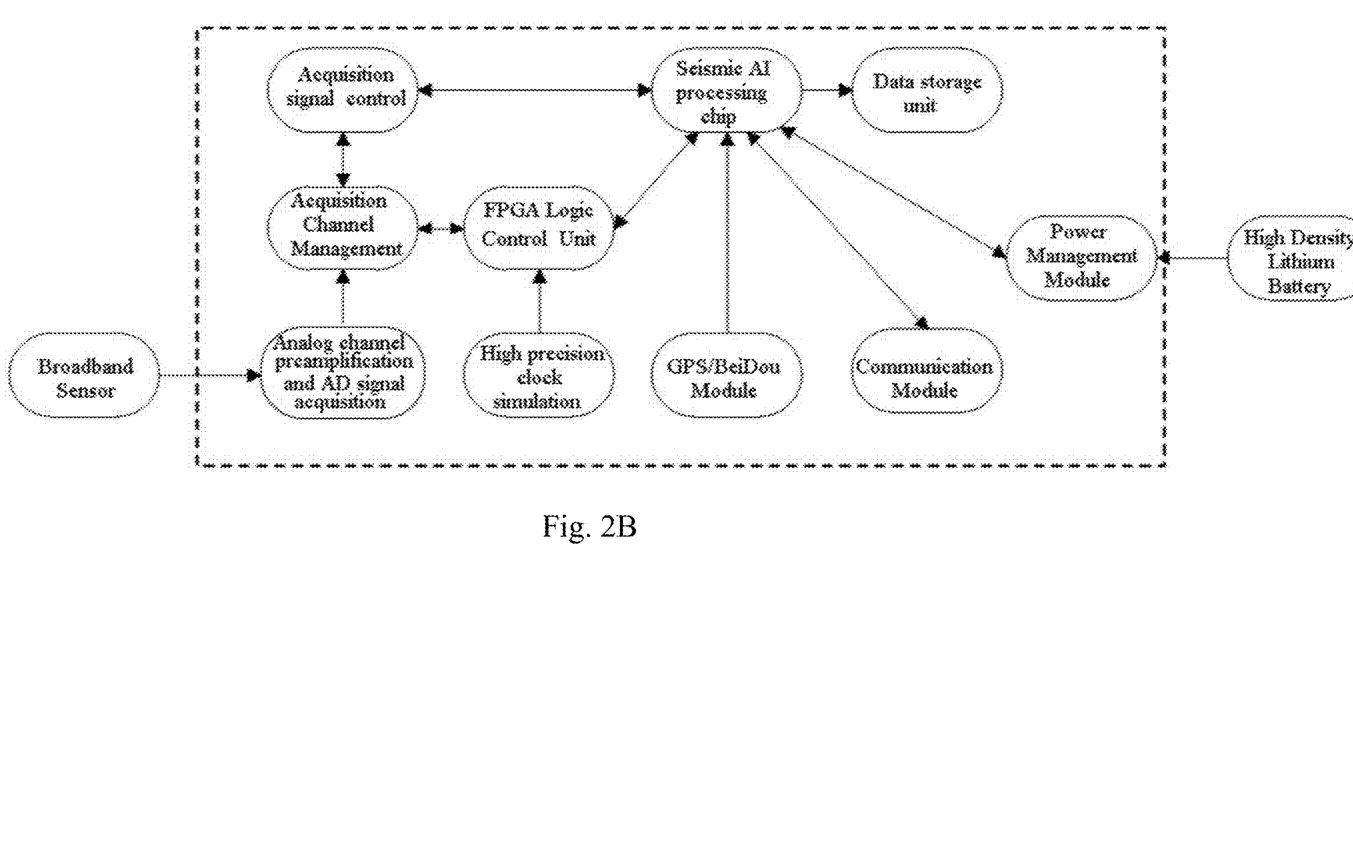
FIG. 2B is a block diagram of the hardware structure of an artificial intelligence real-time microseism monitoring node according to an embodiment of the present disclosure.
Figure 2C:
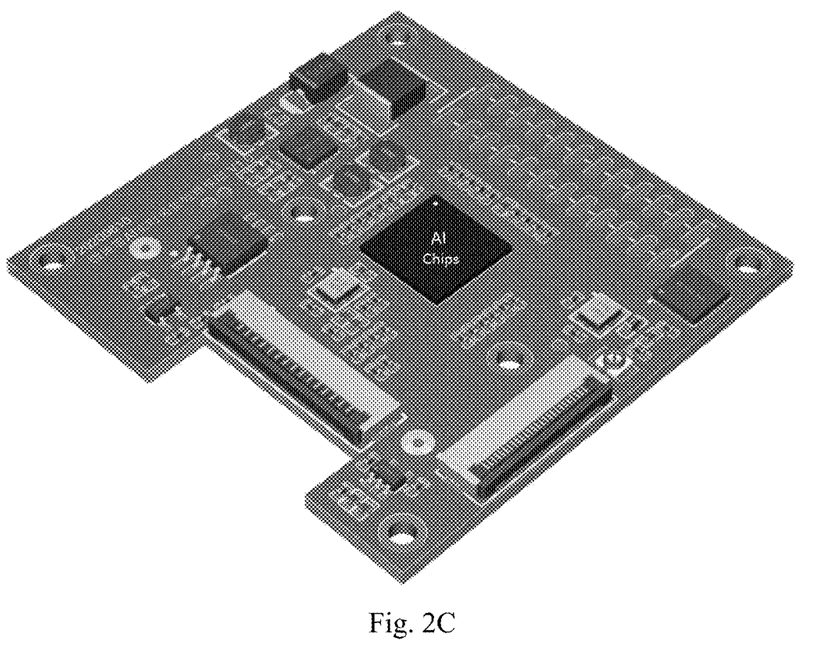
FIG. 2C is a schematic diagram of the main board of the AI real-time microseism monitoring node according to an embodiment of the present disclosure.

Specifically, FIG. 2B shows a block diagram of the hardware structure of an AI real-time microseism monitoring node according to a specific example, FIG. 2C shows a schematic diagram of the main board of the AI real-time microseism monitoring node. With reference to FIG. 2B and FIG. 2C, the main hardware comprises broadband sensors (seismic sensors), analog channel pre-amplification and AD signal acquisition, acquisition channel management, acquisition signal control, FPGA logic control unit, high-precision clock simulation, and microseism AI chip (corresponding to the aforementioned AI calculation device), data storage unit, and power management device. The above-mentioned sensors, analog channel pre-amplification and AD signal acquisition unit, FPGA logic control unit, acquisition channel management unit, clock simulation unit and acquisition signal control unit constitute a data acquisition device. The acquisition channel management unit is connected to the analog channel pre-amplification and AD signal acquisition unit, the acquisition signal control unit, and the FPGA logic control unit. The acquisition signal control unit and FPGA logic control unit are connected to the artificial intelligence computing device. The clock simulation unit is connected to the FPGA logic control unit. The processor first samples the seismic signals through seismic sensors in X, Y and Z directions, converts the seismic signals into analog signals, filters the analog signals through anti-alias filtering circuits, then amplifies the analog signals by means of a programmable amplifier, then controls the A/D converter device to digitize the signals through the FPGA-defined ADC acquisition control program, and finally uses the AI chip to load with AI recognition algorithm (corresponding to the microseism data analysis device) to calculate the acquired data and obtain the valid event data.

Figure 3:
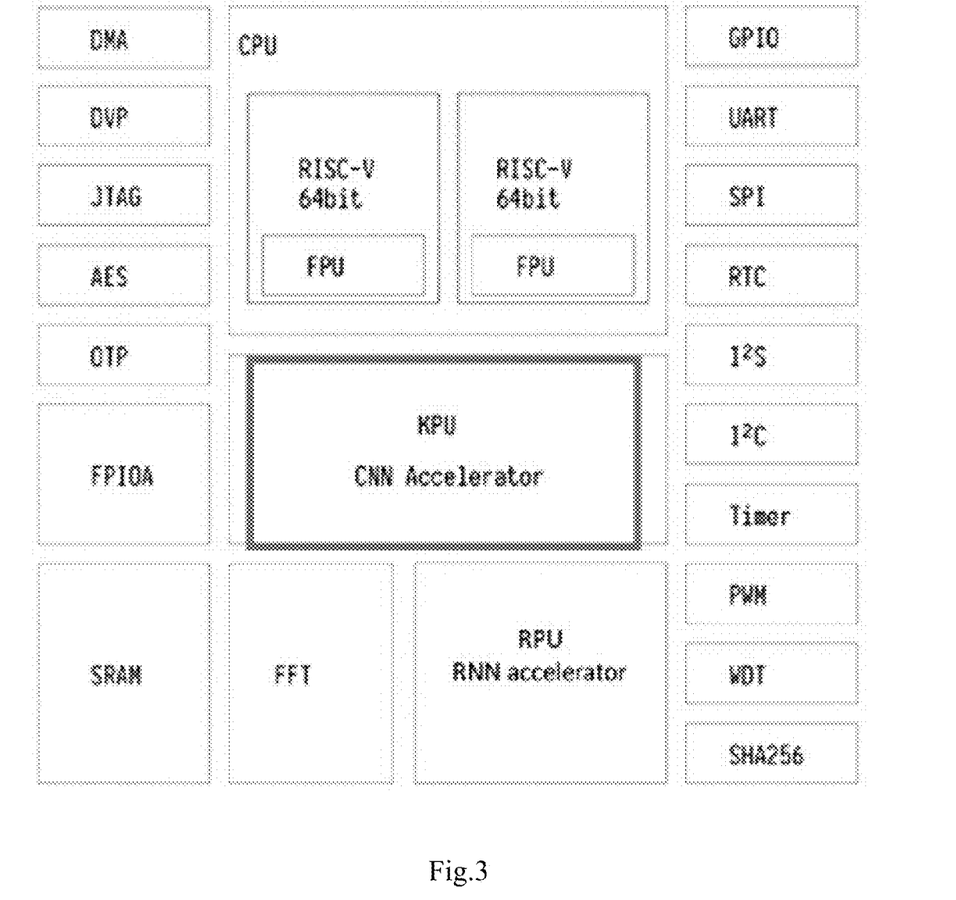
FIG. 3 is a schematic structural diagram of an AI chip according to an embodiment of the present disclosure.

Optionally, referring to FIG. 3, the AI calculation device (AI chip) may be based on, for example, a RISC-V architecture, which can improve computing performance.

Figure 4:
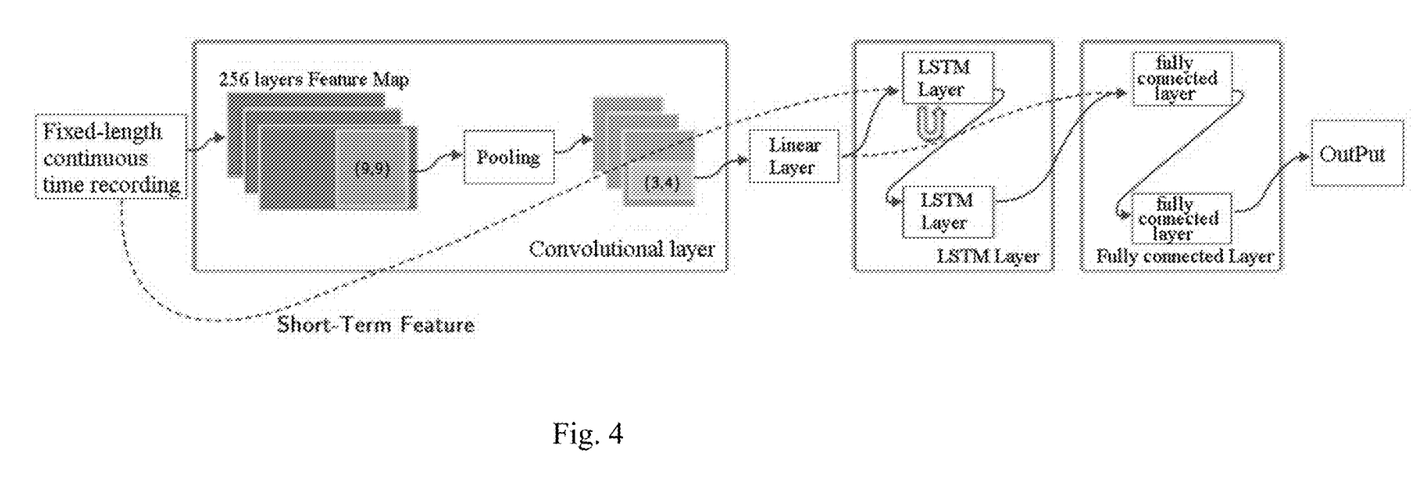
FIG. 4 is a schematic structural diagram of a microseism data analysis device according to an embodiment of the present disclosure.

Optionally, the microseism data analysis device comprises: an input layer, a feature extraction layer, a linear layer, a three-layer Bi-LSTM layer, a fully connected layer and an output layer, wherein the feature extraction layer comprises four convolutional layers: a convolution kernel of a first convolutional layer has a size of (9,9); a convolution kernel of a second convolutional layer has a size of (7,7); a convolution kernel of a third convolution layer has a size of (5,5), and a convolution kernel of a fourth convolution layer has a size of (3,3); a pooling layer with a pooling kernel of 3 is arranged between each two adjacent convolution layers of the four convolution layers;

Specifically, referring to FIG. 4, the microseism data analysis device comprises:

(1) Input layer: the basic unit of the input data is the sampling point, and the input data are all three-component fixed-length data with 4096 sampling points for each component;

2) Feature extraction layer: mainly composed of a convolutional structure. In a specific example, the feature extraction layer includes four convolutional layers; the convolution kernel of the first convolutional layer has the size of (9,9); the convolution kernel of the second convolutional layer has the size of (7,7); the convolution kernel of the third convolution layer has the size of (5,5), and the convolution kernel of the fourth convolution layer has the size of (3,3); the pooling layer with the pooling kernel of 3 is arranged between each two adjacent convolution layers of the four convolution layers;

(3) Linear layer: using the linear layer to reduce the dimensionality of the data, and reduce the dimensionality of the data to 256 data per sampling point;

(4) Bi-LSTM layer: In a preferred example, Bi-LSTM is for example 3 layers, each layer contains 632 units, and the Projection Layer containing 600 units is dimensionally reduced;

(5) Fully connected layer: In a preferred example, there are two fully connected layers, each with 1024 neurons;

(6) Output layer: For example, a multi-classification learning strategy is used to output valid event data, such as earthquake probability.

Valid event data can be accurately calculated by means of the microseism data analysis device based on the above structure.

The operation of calculation on the acquired microseism data by means of the microseism data analysis device to determine the valid event data associated with the microseism, comprising: calculating the acquired microseism data by means of the microseism data analysis device to determine the occurrence probability of microseism associated with the microseism; and/or calculating the acquired microseism data by means of the microseism data analysis device to determine a probability of preliminary wave location of the microseism.

Figure 5:
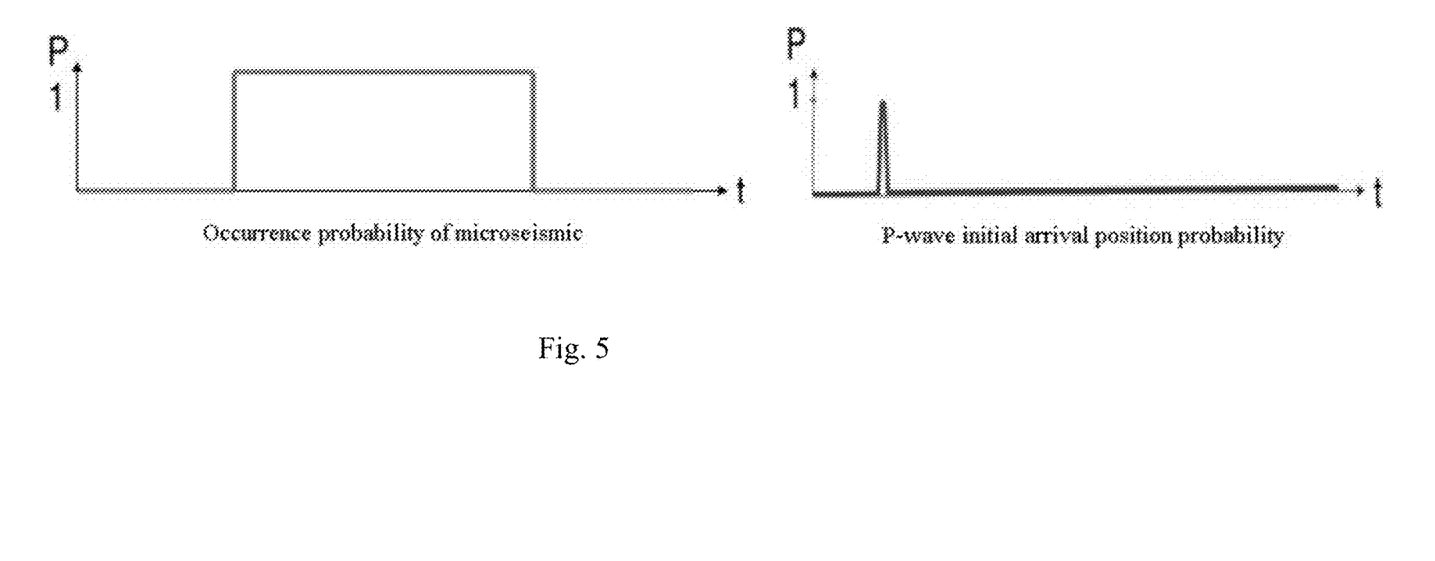
FIG. 5 is a representation diagram of valid event data according to an embodiment of the present disclosure.

Specifically, referring to FIG. 5, the valid event data is, for example, occurrence probability of microseism. In the operation of performing calculations on the acquired microseism data by means of the microseism data analysis device to determine the valid event data associated with the microseism, the acquired microseism data is calculated by means of the microseism data analysis device to determine the occurrence probability of microseism associated with the microseism. The acquired microseism data could also be calculated by means of the microseism data analysis device to determine a probability of preliminary wave location of the microseism. Therefore, what is sent to the remote data center is the occurrence probability of microseism and/or the probability of preliminary wave location of the microseism, so the remote data center can quickly make analysis and judgments based on the probability.

Figure 6:
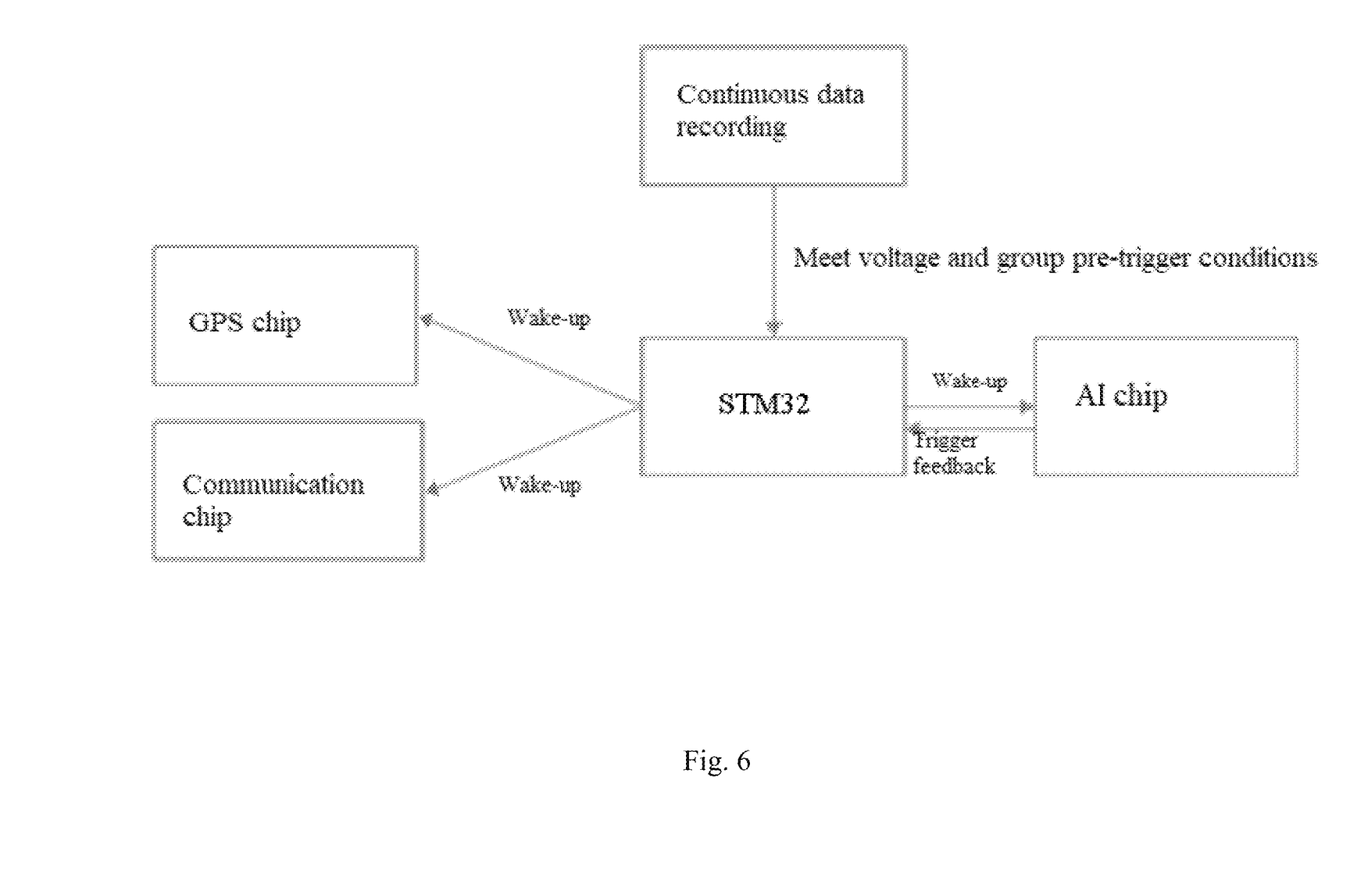
FIG. 6 is a schematic diagram of an STM32-based structure according to an embodiment of the present disclosure.

Optionally, referring to FIG. 6, the processor may be, for example, an STM32-based microcontroller unit, and the AI chip and the communication device (corresponding to the communication transmission chipset in the figure) are controlled by the STM32-based microcontroller unit combines with the underlying management API interface.

Optionally, the STM32-based microcontroller unit is also provided with a trigger threshold of the microseism data, and when determining that the microseism data reaches the trigger threshold, the AI calculation device is turned on.

Specifically, considering the issue of the appearance time monitoring of the artificial intelligence real-time microseism monitoring node, during the integrated design, it is necessary to fully consider how to schedule the AI chip to ensure that a large number of invalid calculations are not performed during the data quiet period, and how to schedule the start-up and hibernation of the data-related on-board devices. In response to this problem, the STM32 according to this embodiment can provide with a minimum trigger power threshold. When determining that the microseism data reaches the trigger threshold, the AI chip is activated for calculation after the STM32 is triggered. The valid event data calculated by the AI chip is feed back to the STM32, and then the STM32 microcontroller unit sends valid event data to the remote data center by means of the communication transmission chipset. In this way, the AI real-time microseism monitoring node according to this solution will only start the AI chip calculation when the seismic data reaches the trigger threshold, so there is no need to perform invalid calculations, which can improve efficiency and save computing resources.

Optionally, it further comprises a positioning device, the positioning device is a GPS device or a Beidou device, and when it is determined that the microseism data reaches the trigger threshold, the positioning device is turned on.

Figure 7:
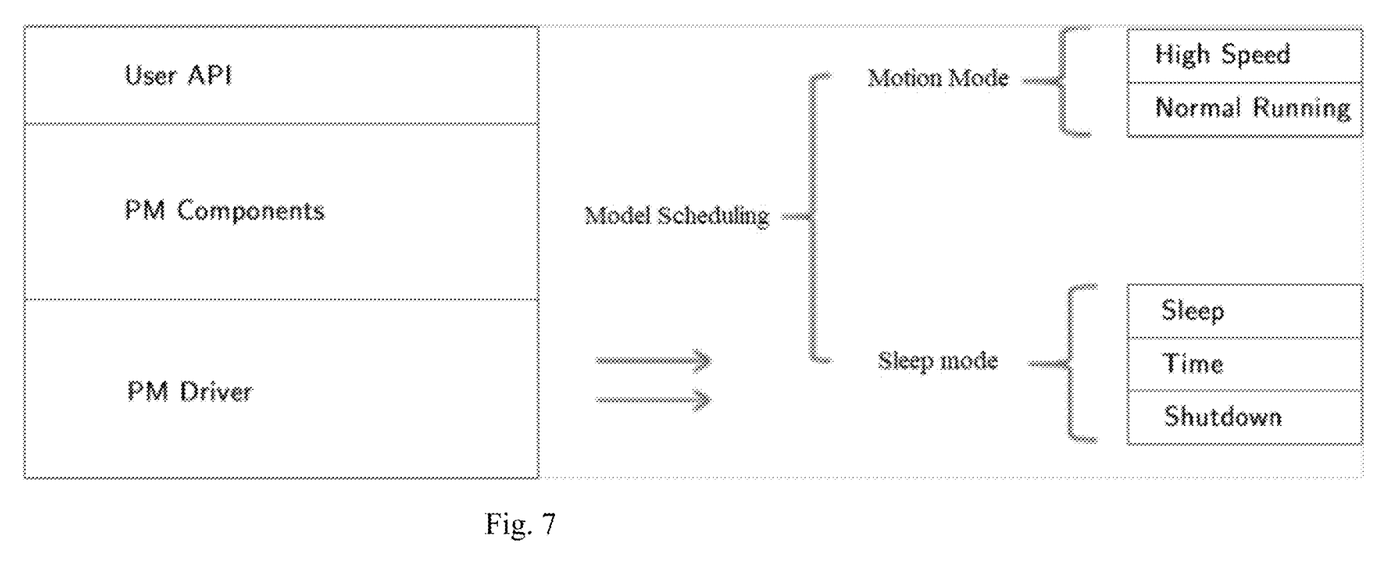
FIG. 7 is a schematic diagram of the framework of a power management system according to an embodiment of the present disclosure.

Specifically, referring to FIGS. 6 and 7, the AI real-time microseism monitoring node also comprises a positioning device. The positioning device can be a GPS device or a Beidou device. The positioning device can determine where the AI real-time microseism monitoring node is located. The positioning device is controlled by STM32-based microcontroller unit combined with the underlying management API interface. When determining that the microseism data reaches the trigger threshold, STM32 also turns on the positioning device, so that the remote data center can quickly know the location of the AI real-time microseism monitoring node, and then can quickly determine the location of the earthquake.

Optionally, considering the limited computing and deployment capabilities of the embedded AI chip, this embodiment uses a simplified deep learning training framework based on TensorFlow Lite to train the microseism data analysis device, namely: constructing microseism AI recognition algorithm. The simplified deep learning training framework based on TensorFlow Lite can make it run on the ARM Cortex architecture AI chip with only small running memory.

Optionally, the communication device is any one of the following: 4G device, 5G device, NB-IOT device.

Specifically, combining the typical application scenarios of unconventional monitoring of artificial intelligence real-time microseism monitoring nodes and the transmission rate requirements of seismic data (0.25 ms sampling, the data stream of three-component data is 375 Kbps), so this embodiment will rely on 4G, 5G Or NB-IOT wireless communication technology to design a self-organizing wireless sensor network system architecture suitable for field seismic acquisition applications. The main hardware is composed of 4G, 5G or NB-IOT communication device and power management device. This part of the system uses a low-power single-chip microcomputer as the system's power management center, which has been working continuously and uninterruptedly. The single-chip microcomputer uses the controllable power supply to power/off the ARM device and the 4G/NB-IOT mobile network device. When the system has no mobile network data transmission task, the power of the ARM device and 4G/NB-IOT mobile network device is disconnected, and the system is in a power-saving standby state with extremely low power consumption. When the AI chip determines that a valid event requires the mobile network to transmit data, it notifies the microcontroller through the serial port control line and turns on the power of the ARM device and 4G/NB-IOT mobile network device. When the microseism acquisition node finishes the mobile network data transmission, it will notify the MCU to stop power supply through the serial control line; when the mobile network transmission data exceeds the preset time, the MCU will automatically cut off the power of the ARM device and 4G/NB-IOT mobile network device.

Optionally, the AI real-time microseism monitoring node is connected to a base station and sends the valid event data to a remote data center via the communication device, comprising: sending the valid event data to the base station via the communication device, sending the valid event data to the remote data center via the base station.

Figure 8:
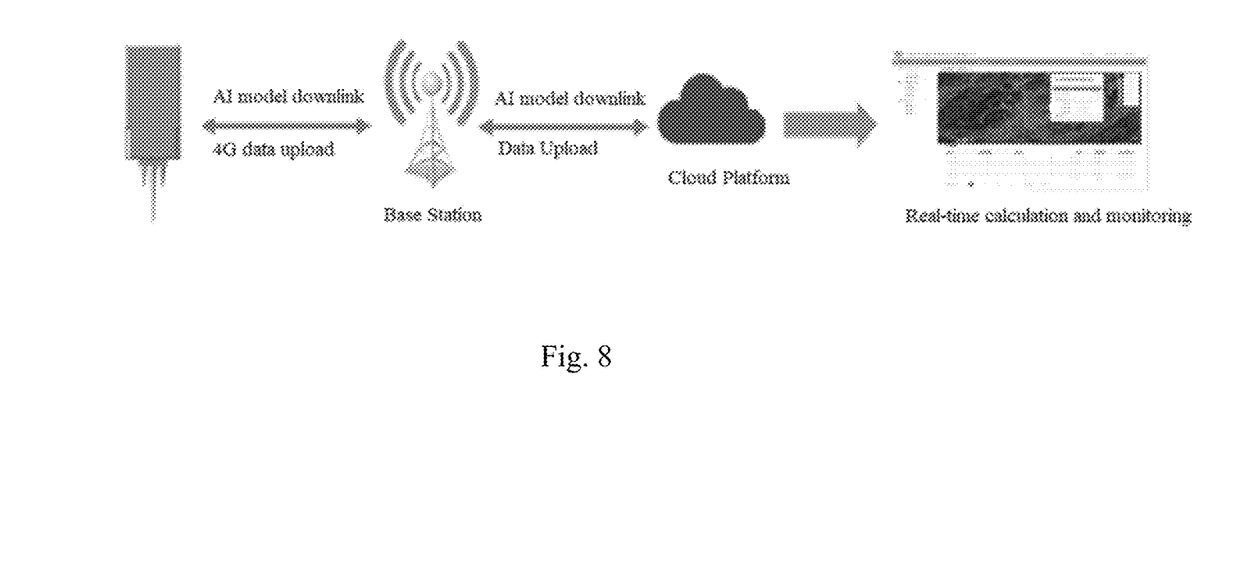
FIG. 8 is a schematic diagram of a communication transmission mode in the presence of a base station according to an embodiment of the present disclosure.

Specifically, referring to FIG. 8, the AI real-time microseism monitoring node is connected to the base station. The AI real-time microseism monitoring node sends valid event data to the base station via a communication device (for example, 4G network), and sends the valid event data to the remote data center (corresponding to the cloud platform in the figure) via the base station.

Optionally, a relay gateway is also provided between the base station and the AI real-time microseism monitoring node, and the valid event data is sent to the remote data center via the communication device, comprises: sending the valid event data to the relay gateway via the communication device, sending the valid event data to the base station via the relay gateway, and sending the valid event data to the remote data center via the base station.

In another example, a relay gateway is also provided between the base station and the AI real-time microseism monitoring node. The AI real-time microseism monitoring node first sends the valid event data to the relay gateway via the communication device (such as the NB-IOT network), then sends the valid event data to the base station via the relay gateway, and finally sends the valid event data to the remote data center via the base station.

Figure 9:
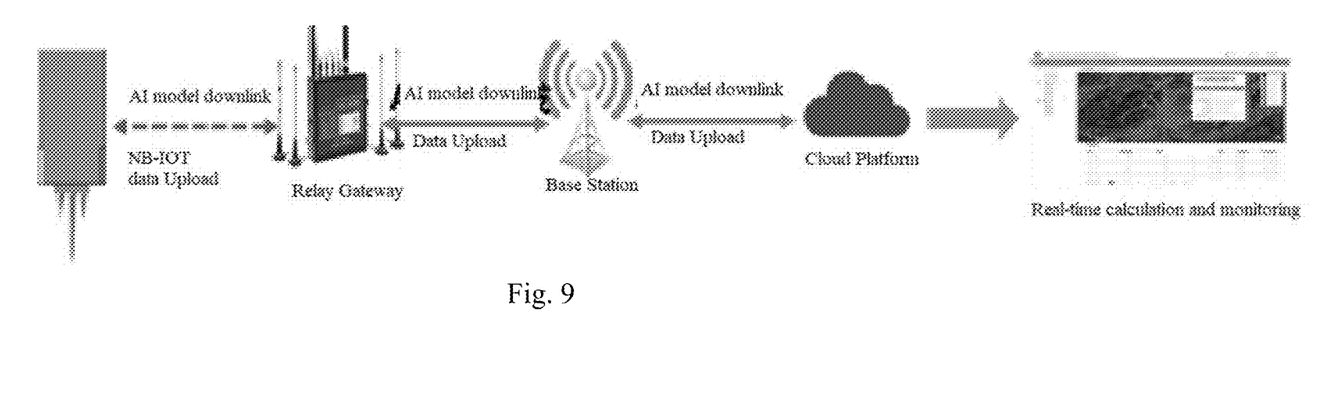
FIG. 9 is a schematic diagram of an ad hoc network communication transmission mode in the absence of a base station according to an embodiment of the present disclosure.

In addition, referring to FIGS. 8 and 9, it should be supplemented that the microseism data analysis device in this implementation is deployed by sending from the remote data center (cloud platform) to the AI real-time microseism monitoring node. In addition, the remote data center can also perform migration training on the microseism data analysis device based on valid event data. That is, the actual valid event data is used to perform migration training on the device to adjust the parameters of the device and optimize the device, so that the device can cope with the actual geographical situation and make flexible adjustments according to changes in the actual geographical situation. The method of migration training can be, for example, a migration training method in the prior art, which is not specifically limited here. In addition, in order to further ensure the accuracy of the valid event data, after receiving the valid event data in this solution, professionals can also perform manual data checking, especially checking the currently insufficiently calculated data, and marking the data. When a sufficient amount of marked data is accumulated, the device is trained by migration training. Then, the remote data center sends the microseism data analysis device after migration training to the AI real-time microseism monitoring node to update the device.

In addition, it needs to be supplemented that there can be a plurality of AI real-time microseism monitoring nodes, and a plurality of AI real-time microseism monitoring nodes are used to acquire valid event data from different locations. In the operation of migration training for microseism data analysis devices, the remote data center performs migration training for the microseism data analysis devices deployed by the corresponding AI real-time microseism monitoring nodes based on the valid event data sent by each AI real-time microseism monitoring node. Therefore, migration training can be performed separately for the device of each AI real-time microseism monitoring node, and each AI real-time microseism monitoring node can cope with the geographical conditions of different locations.

The plurality of artificial intelligence real-time microseism monitoring nodes can be divided into a plurality of groups, and those groups are, for example, deployed in different locations, so that at least one AI real-time microseism monitoring node can be deployed at each location. The microseism data analysis device of the AI real-time microseism monitoring node in each group is, for example, the same. In the process of migration training for microseism data analysis devices, the remote data center performs migration training for the microseism data analysis devices deployed by the AI real-time microseism monitoring nodes of each group based on the valid event data sent by the AI real-time microseism monitoring nodes of the group (where, for example, there can be a master device within each group responsible for aggregating the data and sending it to the server), i.e., perform migration training on the device based on the valid event data, and then send the migration-trained device to the group, and then all the AI real-time microseism monitoring nodes in the group can update the devices. It should be noted here that, in order to ensure the source of the data, the valid event data sent by the AI real-time microseism monitoring node of each group to the remote data center may include: group number, device number, and valid event data, and so on. As a result, a plurality of AI real-time microseism monitoring nodes can be set up in one location for more accurate microseism monitoring.

In order to avoid processing of the continuously acquired microseism data, this solution can also set the acquisition conditions, for example: the acquisition conditions are the acquisition time interval, the acquisition data requirements, etc. Before the AI real-time microseism monitoring node collects microseism data, it is first necessary to determine whether the AI real-time microseism monitoring node of each group meets the preset acquisition conditions. When the preset acquisition conditions are met, the AI real-time microseism monitoring node of each group acquires microseism data. Therefore, continuous acquisition is not required, unnecessary data acquisition and transmission is reduced, and the data analysis pressure on the server side is reduced.

Specifically, in the operation of determining whether the AI real-time microseism monitoring nodes of the group meet the preset acquisition conditions, first, the AI real-time microseism monitoring nodes of the group broadcast status information in the group. The status information is used to record the monitoring status of the AI real-time microseism monitoring node, such as whether there is an abnormality. For example, the Lora data transmission method can be used for intra-group broadcasting. Then, calculating the number of devices in the artificial intelligence real-time microseism monitoring node whose status information meets the preset trigger conditions in the group. Eventually, based on the number of devices and the preset first threshold value, the AI real-time microseism monitoring nodes within the group are determined to meet the preset acquisition conditions. For example, in the case that the number of devices exceeds the first threshold, anomalies may occur, so it is necessary to perform data acquisition and turn on the microseism data analysis device for analysis.

The status information broadcast by the AI real-time microseism monitoring node within the group includes, for example, a status identifier, and may also include the ID of the AI real-time microseism monitoring node. Before calculating the number of devices of the AI real-time microseism monitoring nodes within the group whose status information satisfies the preset trigger condition, this solution also determines whether said status information within said group satisfies the preset trigger condition based on the state identification. In a specific instance, the status identifier is of type bool, and is composed of a True identifier and a False identifier. After deployment, the AI real-time microseism monitoring node sets a signal minimum trigger threshold through the circuit. When the acquired signal voltage exceeds the minimum trigger threshold, the state of the artificial intelligence AI real-time microseism monitoring node is marked as True, and when the state is marked as True, it is determined that the status information in the group meets the preset trigger condition, and the corresponding field of the group broadcast is immediately updated at the same time.

According to this embodiment, the AI real-time microseism monitoring node first collects microseism data, then uses the microseism data analysis device of the AI calculation device to process the acquired data to obtain valid event data, and finally sends the valid event data to the remote data center. Compared with the prior art, this solution can process the microseism data at the data acquisition end (i.e., AI real-time microseism monitoring node) and send the calculated valid event data to the remote data center, so the amount of data sent can be significantly reduced and the remote data center only needs to analyze the valid event data. In this way, the technical effect of reducing the pressure of data transmission and the computing load of the remote data center is achieved. In addition, the AI real-time microseism monitoring node uses the microseism data analysis device to calculate the microseism data, so manual intervention can be reduced and efficiency can be improved. In this way, the technical problems of the prior art are solved, i.e., the massive amount of microseism data analysis is carried out in the remote data center, which leads to high data transmission pressure, excessive computational load on the remote data center and inefficiency due to excessive manual intervention.

The numbers of the foregoing embodiments of the present invention are only for description, and do not represent the advantages and disadvantages of the embodiments.

In the above-mentioned embodiments of the present invention, the description of each embodiment has its own focus. For parts that are not described in detail in an embodiment, reference may be made to related descriptions of other embodiments.

In the several embodiments provided in this application, it should be understood that the disclosed technical content can be implemented in other ways. The device embodiments described above are merely illustrative. For example, the division of the units is only a logical function division, and there may be other divisions in actual implementation. For example, a plurality of units or components can be combined or integrated into another system, or some features can be ignored, or not implemented. In addition, the displayed or discussed mutual coupling or direct coupling or communication connection may be indirect coupling or communication connection through some interfaces, units or devices, and may be in electrical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present invention may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable storage medium.

Based on this understanding, the technical solution of the present invention essentially or the part that contributes to the existing technology or all or part of the technical solution can be embodied in the form of a software product, and the computer software product is stored in a storage medium, including several instructions to make a computer device (which may be a personal computer, a server, or a network device, etc.) execute all or part of the steps of the methods described in the various embodiments of the present invention. The aforementioned storage media include: U disk, read-only memory (ROM, Read-Only Memory), random access memory (RAM, Random Access Memory), mobile hard disk, magnetic disk or optical disk and other media that can store program codes.

The above are only the preferred embodiments of the present invention. It should be pointed out that for those of ordinary skill in the art, without departing from the principle of the present invention, several improvements and modifications can be made. These improvements and modifications should also be regarded as the protection scope of the present invention.

What is claimed is:

1. An artificial intelligence (AI) real-time microseism monitoring node selected from a group of multiple AI real-time microseism monitoring nodes that are used to acquire valid event data from different locations, comprising:
a processor;
a data acquisition device;
an AI calculation device; and
a communication device connected to the processor;
wherein the AI calculation device comprises a pre-trained microseism data analysis device; the microseism data analysis device is sent from a remote data center to the AI real-time microseism monitoring node, migration training is performed separately for the microseism data analysis device of the AI real-time microseism monitoring node, so the AI real-time microseism monitoring node copes with geographical conditions of different locations;
wherein the microseism data analysis device comprises an input layer, a feature extraction layer, a linear layer, a three-layer Bi-LSTM layer, a fully connected layer, and an output layer; wherein the feature extraction layer comprises four convolutional layers:
wherein a convolution kernel of a first convolutional layer has a size (9, 9), a convolution kernel of a second convolutional layer has a size (7, 7), and a convolution kernel of a third convolutional layer has a size (5, 5), a convolution kernel of a fourth convolutional layer has a size (3, 3); a pooling layer with a pooling kernel of 3 is arranged between each two adjacent convolution layers of the four convolutional layers;
wherein when preset acquisition conditions are met, the AI real-time microseism monitoring node acquires microseism data, wherein the preset acquisition conditions are met when:
the AI real-time microseism monitoring node broadcasts status information in the group, wherein the status information is used to record a monitoring status of the AI real-time microseism monitoring node;
a status identifier determines whether the status information satisfies a preset trigger condition, the status identifier is of type bool; the status identifier is composed of a True identifier and a False identifier; the AI real-time microseism monitoring node sets a signal minimum trigger threshold through a circuit, when an acquired signal voltage exceeds the signal minimum trigger threshold, the status identifier of the AI real-time microseism monitoring node is marked as the True identifier; and when the status identifier is marked as the True identifier, it is determined that the status information in the group meets the preset trigger condition, and a corresponding field of the status information in the group is immediately updated and broadcast at the same time, then, calculating the number of devices in the AI real-time microseism monitoring node whose status information meets the preset trigger condition in the group; and
based on the number of the devices and a preset first threshold value, the AI real-time microseism monitoring node in the group is determined to meet the preset acquisition conditions;
wherein an AI chip and the communication device are controlled by the processor connected with an application program interface (API) interface, the processor is further configured with a trigger threshold for microseism data; when the processor determines that the microseism data reaches the trigger threshold, the AI calculation device is turned on; the AI chip is embedded in the processor; the AI chip uses a simplified deep learning training framework based on TensorFlow Lite to train the microseism data analysis device, the processor provides with a minimum trigger power threshold, when determining that the microseism data reaches the trigger threshold for the microseism data; the AI chip is activated for calculation: the valid event data calculated by the AI chip is feed back to the processor; and then the processor sends the valid event data to the remote data center by means of a communication transmission chipset;
wherein the processor is configured to perform the following operations:
controlling the data acquisition device to acquire the microseism data;
turning on the AI calculation device to calculate the acquired microseism data by means of the microseism data analysis device to determine the valid event data associated with a microseism;
calculating the acquired microseism data by means of the microseism data analysis device to determine an occurrence probability of microseism associated with the microseism;
and/or calculating the acquired microseism data by means of the microseism data analysis device to determine a preliminary wave location of the microseism; and
sending the valid event data to a remote data center through the communication device.

2. The AI real-time microseism monitoring node according to claim 1, wherein the processor is an STM32-based microcontroller unit.

3. The AI real-time microseism monitoring node according to claim 2, wherein the AI real-time microseism monitoring node further comprises a positioning device; the positioning device is a GPS device or a BeiDou device; when it is determined that the microseism data reaches the trigger threshold, the positioning device is turned on.

4. The AI real-time microseism monitoring node according to claim 1, wherein the AI calculation device is based on a RISC-V architecture.

5. The AI real-time microseism monitoring node according to claim 1, wherein the communication device is any one of a 4G device, a 5G device, or a NB-IOT device.

6. The AI real-time microseism monitoring node according to claim 1, wherein the AI real-time microseism monitoring node is connected to a base station and sends the valid event data to the remote data center via the communication device; the communication device sends the valid event data to the base station, and the base station sends the valid event data to the remote data center.

* * * * *